April 10, 1928.
C. F. A. EDDY
1,665,584
SIGNAL SYSTEM AND DIRECTION INDICATOR FOR AUTOMOBILES
Filed July 20, 1923  2 Sheets-Sheet 1
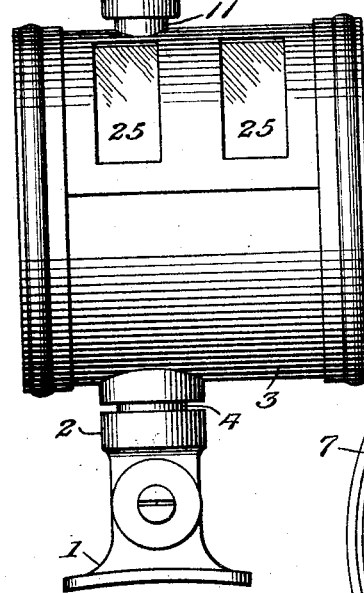
Fig. 1.
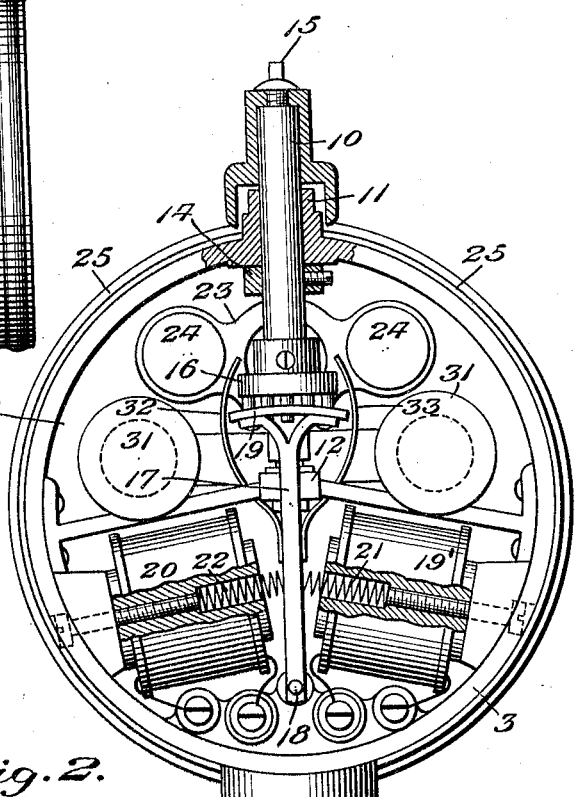
Fig. 2.
Fig. 6.
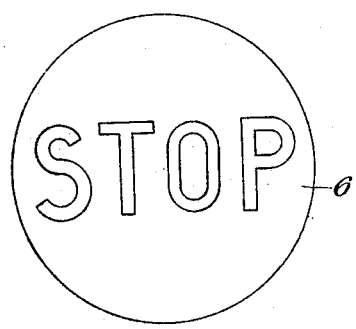
Inventor
Charles F. H. Eddy
By Lewis Bagg
his Attorneys April 10, 1928.
C. F. A. EDDY
1,665,584
SIGNAL SYSTEM AND DIRECTION INDICATOR FOR AUTOMOBILES
Filed July 20, 1923     2 Sheets-Sheet 2
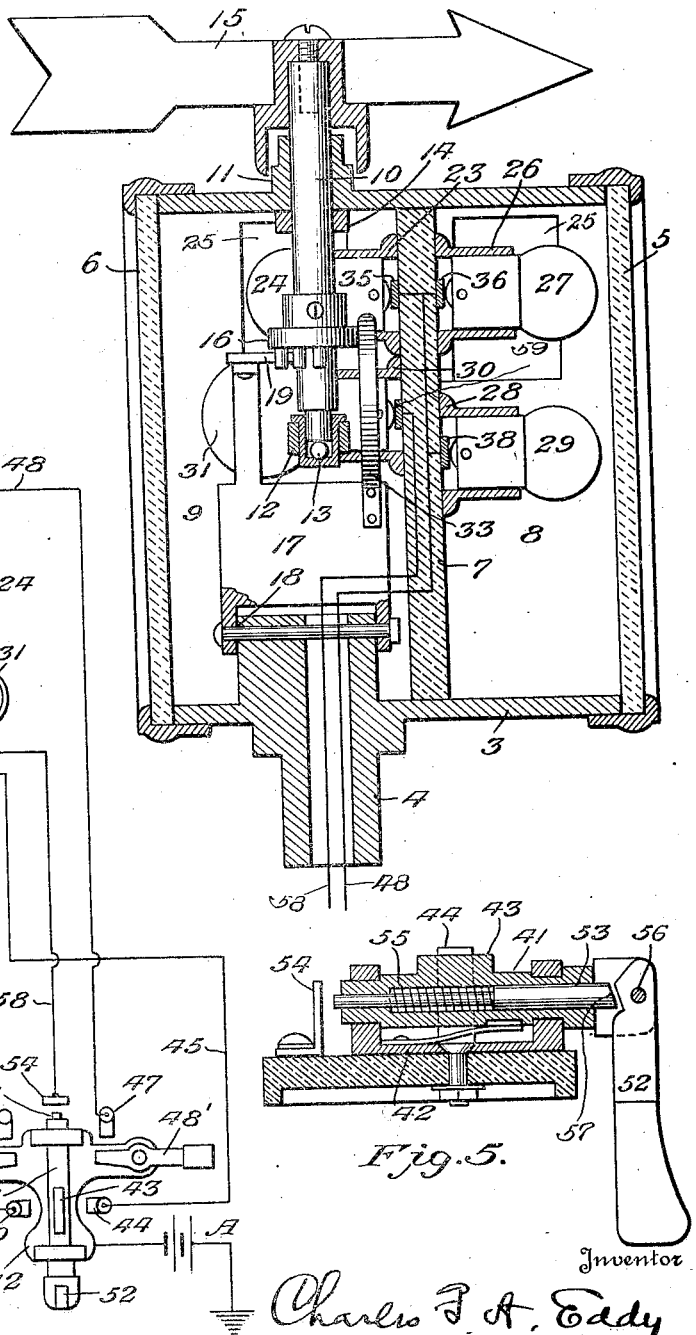
Inventor
Charles F. A. Eddy
By Louis Boger
his Attorneys Patented Apr. 10, 1928.

1,665,584

UNITED STATES PATENT OFFICE.

CHARLES F. A. EDDY, OF NEW LONDON, CONNECTICUT.

SIGNAL SYSTEM AND DIRECTION INDICATOR FOR AUTOMOBILES.

Application filed July 20, 1923. Serial No. 652,810.

This invention relates to a signal system and direction indicator for automobiles.

The object of the invention contemplates the provision or means in the form of an indicating arrow at the side of the machine visible from the front and rear of the machine for indicating the direction in which the machine is to turn.

Another object of the invention is to provide means for indicating when the machine is about to stop.

Another object of the invention is to provide automatic illuminating means for said indicating arrow when in operation, independent illuminating means being provided for the stop signal.

In the accompanying drawings:

Fig. 1 is a side elevation of the indicator;

Fig. 2 is a rear view of the indicator with the lens removed and showing parts in section;

Fig. 3 is a longitudinal vertical sectional view through the indicator;

Fig. 4 is a diagrammatic view showing the wiring of the indicator and controlling device, and Fig. 5 is a sectional view of the controlling switch.

The indicating device consists of a base 1 to which is pivotally attached a socket 2. Supported on the socket 2 is a cylindrical casing 3, provided on its lower side with a shank 4 adapted to be received in the socket 2.

The front of the casing is provided with a lens 5 preferably green in color, while the rear of the casing is provided with a red lens 6 having the word "Stop" inscribed upon it. Centrally of the casing is a partition 7 of insulating material dividing the casing into front and rear compartments 8 and 9.

Vertically mounted in the casing is rotatable shaft 10 supported at its upper end by a bushing 11, its lower end being received in a step bearing 12, the extreme lower end of the shaft 10 resting upon a ball bearing 13. A collar 14 beneath the bushing 11 limits the vertical movement of the shaft 10. Secured to the upper end of the shaft 10 exteriorly of the casing is the indicating arrow 15. Keyed to the shaft 10 is a pin gear 16.

The numeral 17 indicates an armature pivoted as at 18 to the bottom of the casing. Arranged on the upper end of the armature is a gear rack 19 adapted to mesh with the pin gear 16. Arranged on either side of the armature 17 are the magnets 19' and 20, the armature being held in a normal position between the magnets 19' and 20 by means of springs 21 and 22 extending outwardly from the center of the magnets 19' and 20.

Arranged in the rear compartment 9 is a double lamp socket 23 mounted upon the insulated partition 7. This socket is adapted to receive the rear arrow illuminating lights 24—24, the socket being of such a length as to position the lights on either side of the shaft 10. The casing 3 is provided with suitable openings 25 on either side of the rotatable shaft 10 which permits the light from the lamps 24 to illuminate the arrow 15 as it is turned in either direction. Arranged in the front compartment 8 of the indicating device is a similar lamp socket 26 adapted to receive the arrow illuminating lights 27—27. A socket 28 is arranged in the front compartment below the arrow illuminating lights, said socket adapted to receive an additional illuminating lamp 29.

The numeral 30 indicates a suitable lamp socket arranged in the rear compartment 9 adapted to receive the illuminating lights 31—31. These lights are preferably used for illuminating the word "Stop" upon the rear lens 6, the latter lights being independently controlled from the arrow illuminating lights 24—24 and 27—27.

It is desirable that the arrow illuminating lights 24 and 27 be illuminated only when the arrow is in its operative position, namely, pointing to the right or to the left. To accomplish this, the armature 17 is provided with a pair of contact members 32 and 33 one of which when the armature is moved to one side or the other is adapted to contact with the lamp socket 23 inasmuch as the armature 17 is connected by wire 17' to the ground, and by wire 48 to the switch-base 42, thence to a source of supply A, it being understood that the lamp sockets 23 and 26 of the front and rear compartments are connected together by a suitable contact medium 34. Arranged within the lamp socket 23 is a contact member 35 adapted to contact with the illuminating lights 24. Arranged within the socket 26 in the front compartment is a similar contact member 36 adapted to contact with the illuminating lights 27—27. These contact members 35 and 36 are preferably connected together by a suitable wire 37. A contact member 38 leading from the illuminating light 29 is connected to the wire 37 by wire 39, the lamp receptacle 28 being grounded by wire 40 as indicated.

Located within convenient reach of the operator is an actuating switch preferably consisting of a rotatable shaft 41 mounted upon a suitable base 42, the latter preferably being grounded to the frame of the machine. Carried by the shaft 41 is a contact segment 43 adapted to contact with a contact member 44 which is connected by wire 45 to the magnet 19', the latter being grounded to the frame by wire 46.

A terminal 47 is arranged adjacent the base 42 and carried by the base is a switch 48' which is adapted to contact with the terminal 47. Said terminal 47 is connected by means of a wire 48 to the wire 37 thence to the arrow illuminating lights 24—24 and 27—27.

It will thus be seen that as armature 17 is swung to the right or left the contact points 32 or 33 will contact with the lamp socket 23 and complete the circuit between the arrow illuminating lights and the ground. The magnet 20 is connected by wire 49 to a contact member 50 arranged on the opposite side of the contact point 44 which controls the magnet 19, the other side of said magnet 20 being connected by wire 51 to ground. It will therefore be seen that as the shaft 41 is moved to the right or left by the handle 52, the magnets 19 and 20 will be alternately energized to effect the movement of the armature 17.

The rear lights 31—31 adapted to additionally illuminate the word "Stop" in the rear red lens 6 are preferably actuated in the following manner.

Arranged for longitudinal movement in the shaft 41 is a plunger 53 which is adapted to contact with a contact member 54 mounted adjacent to the outer end thereof, said plunger being held normally out of contact therewith by spring 55. As disclosed in Fig. 5 the handle 52 of the switch is pivoted as at 56, the inner face thereof adapted to engage the beveled end 57 of the plunger 53. Therefore, the longitudinal movement of the plunger 53 by means of the switch handle 52 will make contact with the contact member 54 which in turn is connected by a wire 58 to a contact member 59 having engagement with the stop light lamps 31—31, the socket 30 separating these lights being grounded by wire 40 completes the circuit between the lights effecting further illumination when desirable.

It will thus be seen that I have constructed a unified system for imparting a visual signal to the traffic whereby the movement of the operator of the car may be readily ascertained from within the front or rear of the vehicle.

I claim:

1. A direction indicator including a casing having a transverse partition therein dividing the casing into compartments, a movable signal mounted on said casing above the top thereof, each of the compartments having openings in the top thereof, and illuminating means mounted within the compartments in position to illuminate the signal through the openings.

2. A direction indicator including a casing having a transverse partition therein dividing the casing into compartments, a movable signal mounted on said casing above the top thereof, means for moving said signal, illuminating means within and for illuminating said compartments, each of said compartments having openings in the top thereof, and secondary illuminating means mounted within the compartments in position to illuminate the signal through the openings.

3. A direction indicator including a casing having a transverse partition therein separating the casing into front and rear compartments, a movable signal mounted on the casing above the top thereof, means for moving said signal, illuminating means within and for illuminating said compartments, each of said compartments having openings in the top thereof, and secondary illuminating means within the front and rear compartments, connected together and in position to simultaneously shine through the openings.

4. A direction indicator including a casing having a partition therein separating the casing into front and rear compartments, illuminating means within and for independently illuminating each of said compartments, each of said compartments having openings in the top thereof, a movable direction indicator mounted on said casing above the top thereof adjacent said openings, and secondary illuminating means within the front and rear compartments, connected together, and in position to simultaneously shine through the openings and illuminate the movable direction indicator.

In testimony whereof I affix my signature.

CHARLES F. A. EDDY.